United States Patent
Fitterer et al.

(10) Patent No.: US 11,381,521 B2
(45) Date of Patent: Jul. 5, 2022

(54) SWITCH COMPRISING AN OBSERVATION PORT AND COMMUNICATION SYSTEM COMPRISING SUCH A SWITCH

(71) Applicant: THALES, Courbevoie (FR)

(72) Inventors: Eric Fitterer, Mérignac (FR); Alain Dugas, Mérignac (FR); Yves Finaz, Mérignac (FR); Frédéric Laloire, Mérignac (FR); Stéphane Monnier, Mérignac (FR)

(73) Assignee: THALES, Courbevoie (FR)

( * ) Notice: Subject to any disclaimer, the term of this patent is extended or adjusted under 35 U.S.C. 154(b) by 44 days.

(21) Appl. No.: 16/725,588

(22) Filed: Dec. 23, 2019

(65) Prior Publication Data
US 2020/0213247 A1 Jul. 2, 2020

(30) Foreign Application Priority Data
Dec. 26, 2018 (FR) ...................... 18 74161

(51) Int. Cl.
*H04L 49/00* (2022.01)
*H04L 43/12* (2022.01)
*H04L 49/351* (2022.01)
*H04L 49/55* (2022.01)
*H04L 67/12* (2022.01)

(52) U.S. Cl.
CPC ............. *H04L 49/30* (2013.01); *H04L 43/12* (2013.01); *H04L 49/351* (2013.01); *H04L 49/555* (2013.01); *H04L 67/12* (2013.01)

(58) Field of Classification Search
CPC ...................................... H04L 49/30
See application file for complete search history.

(56) References Cited

U.S. PATENT DOCUMENTS 8,959,297 B2 * 2/2015 Carter .................. G06F 3/0683
  711/157
2009/0303883 A1 * 12/2009 Kucharczyk .......... H04L 49/254
  370/241

(Continued)

FOREIGN PATENT DOCUMENTS

| EP | 2 822 746 B1 | 2/2016 |
| FR | 3 065 392 A1 | 10/2018 |
| WO | WO 2016/099896 A1 | 6/2016 |

OTHER PUBLICATIONS

French Search Report, from the French Patent Office in counterpart French Application No. 1900261, dated Oct. 7, 2019.

*Primary Examiner* — Jason E Mattis
(74) *Attorney, Agent, or Firm* — ArentFox Schiff LLP

(57) ABSTRACT

The present invention relates to a switch including a plurality of input ports, a plurality of output ports, at least one output port, called observation port, being connected to an observation module able to analyze the traffic of the frames passing through via the switch, and a conveying component configured to convey each frame.

The switch is configured to transmit, to the observation modules via the observation port, only frames according to a first observation condition and a second observation condition. The compliance of a frame with the first observation condition is determined as a function of an observation field and the compliance with the second observation condition is determined as a function of the identifier and/or of an input and/or output port associated with this frame.

12 Claims, 2 Drawing Sheets

(56) References Cited

U.S. PATENT DOCUMENTS

| | | | |
|---|---|---|---|
| 2011/0154108 A1* | 6/2011 | Candia | H04L 49/201 714/25 |
| 2015/0106537 A1* | 4/2015 | Bobrek | H04L 12/40169 710/54 |
| 2016/0173472 A1* | 6/2016 | Toillon | H04L 63/08 726/5 |
| 2017/0013086 A1* | 1/2017 | Santoso | H04L 67/12 |

* cited by examiner

025
SWITCH COMPRISING AN OBSERVATION PORT AND COMMUNICATION SYSTEM COMPRISING SUCH A SWITCH

CROSS-REFERENCE TO RELATED APPLICATIONS

This application is a U.S. non-provisional application claiming the benefit of French Application No. 18 74161, filed on Dec. 26, 2018, which is incorporated herein by reference in its entirety.

FIELD OF THE INVENTION

The present invention relates to a switch including an observation port.

The present invention also relates to a communication system comprising such a switch.

The invention is applicable to implement an avionics network such as an avionics network according to standard ARINC 664.

BACKGROUND

In a manner known in itself, standard ARINC 664 is based on the Ethernet standard, and makes it possible to adapt the use of this standard to the avionic context, and in particular to avionic constraints.

Standard ARINC 664 is made up of several parts, each part being usable as a function of constraints imposed on data passing through the avionic network implemented according to this standard.

Among these parts, known in particular is the part referenced by "P7" and generally denoted by "ARINC 664 P7" or "ARINC 664 Part 7" or "AFDX 0".

This part P7 is usable to transmit avionic data between different avionic systems implementing essential functions of the airplane and thus has the largest number of constraints.

Thus, an avionic network implemented according to part P7 has a segregated, redundant and deterministic network. The determinism of this network in particular means that each frame emitted reaches its destination in a known maximum time.

In certain avionic networks, it is also possible to use the Ethernet protocol (within the meaning of standard IEEE 802.3-2000 and subsequent versions) combined with a certain number of additional restrictions imposed by the nature of the corresponding network.

Compared with part P7 of standard ARINC 664, the Ethernet protocol with restrictions has fewer constraints and is thus usable to implement avionic networks transmitting less sensitive and/or less critical data.

These data generally present maintenance, download and service function data for the crew relative to different avionic systems. Thus, if these data are lost, they can be resent again without creating a considerable risk for the safety of the airplane.

The additional restrictions imposed on the Ethernet protocol can in particular relate to the manner in which frames are routed. Thus for example, this routing can be predetermined within each switch of the network, as a function of the identifier of the frame.

This is for example the case of the part referenced by "P3" of the ARINC 664 standard, which is also based on the Ethernet protocol but which has fewer constraints compared with part P7 and recommends, however, a network use configured statically for an operational mode on the airplane.

In order to ensure the proper working of an avionics network, it is known in the state of the art to implement an observation function in switches forming such a network.

In particular, this observation function makes it possible to analyze the traffic of the frames passing through the corresponding switch in order to determine any problems related to the transmission of the frames. It is in particular applicable in the design stage of the network, but also during its normal operation.

The observation is more generally done via a dedicated port of the switch and can be implemented on several levels.

Thus for example, for a network of type ARINC 664 P7, the observation can be implemented for one or several data flows, for one or several ports, or for all of the traffic passing through the corresponding switch.

In the first case, the observation is applied to all of the frames of a same flow having to be observed.

In the second case, the observation is applied to all of the frames passing through via the port having to be observed.

In the last case, the observation is applied to all of the frames passing through via the corresponding switch.

In all of these cases, the frames to be observed are transmitted to the port dedicated to the observation and are next analyzed by a specific end system connected to this port.

Furthermore, in light of the constraints imposed on the avionics networks, the observation function is imposed on the corresponding switch in a static manner and cannot be modified during its operation.

Thus for example, when a switch is configured to implement an observation function for example at one or several flows, each frame of this or these flows will systematically be redirected toward the observation port.

One can then see that this poses a certain number of difficulties.

First of all, such an observation function can create significant traffic toward the observation port, which can saturate it. Furthermore, it would sometimes be interesting to observe different flows and/or ports and therefore to modify flows and/or ports to be observed dynamically.

SUMMARY

The present invention aims to propose a switch and a communication system able to implement the observation function dynamically. In other words, the invention makes it possible to modify the observation function without a reconfiguration of the system being necessary.

To that end, the invention relates to a switch for an avionics communication system transmitting digital data in the form of frames according to a data transmission protocol of the Ethernet type with predetermined routing, each frame comprising an identifier and an observation configuration field;

the switch including:
  a plurality of input ports, each input port being able to receive frames coming from an end system or another switch;
  a plurality of output ports, each output port being able to transmit frames to an end system or another switch, at least one output port, called observation port, being connected to an observation module able to analyze the traffic of the frames passing through via the switch;

a conveying component configured to convey each frame according to said transmission protocol between at least one input port and one or several output ports;

each input and output port being associated with an identifier;

the switch being configured to transmit, to the observation module via the observation port, only frames according to a first observation condition and a second observation condition;

the compliance of a frame with the first observation condition being determined as a function of the observation field of this frame and the compliance with the second observation condition being determined as a function of the identifier and/or of an input and/or output port associated with this frame.

According to other advantageous aspects of the invention, the switch comprises one or more of the following features, considered alone or according to all technically possible combinations:

the conveying component is configured to check the compliance of each frame with the first observation condition and when this frame complies with this condition, to transmit it to the observation port;

the observation port is configured to check the compliance of each frame with the second observation condition and when this frame complies with this condition, to transmit it to the observation module;

the observation port is associated with a configuration table defining, for each frame, its compliance with the second observation condition as a function of the identifier of this frame and/or the identifier of the input port having received this frame and/or the identifier of one or several output ports for which this frame is intended;

it further comprises a configuration module making it possible to configure the configuration table of the observation port;

the configuration module is configured to be checked dynamically, during the operation of the avionics communication system;

the observation configuration field of each frame defines an observation access level of this frame, the compliance with the second observation condition being determined as a function of this access level and one or several outside parameters, preferably relative to the operation of the avionics communication system and/or the observation module;

said transmission protocol is of type ARINC 664 P7;

said protocol is a mixed protocol made up of a protocol of type ARINC 664 P7 and a protocol of the Ethernet type with predetermined routing;

the conveying component is able to differentiate between the data frames according to the protocol of type ARINC 664 P7 and the data frames according to the protocol of the Ethernet type with predetermined routing, and to process each data frame according to the protocol corresponding to it, each data frame according to the protocol of the ARINC 664 P7 type being processed as a priority relative to each data frame according to the protocol of the Ethernet type with predetermined routing.

The invention also relates to an avionics communication system including a plurality of switches connected to one another in order to form a computer network; a plurality of end systems, each end system sending and/or receiving digital data and being connected to at least one switch; the digital data assuming the form of frames according to a data transmission protocol of the Ethernet type with predetermined routing, each frame comprising an identifier and an observation configuration field; and wherein at least one of the switches is as previously described.

According to other advantageous aspects of the invention, the system comprises one or more of the following features, considered alone or according to all technically possible combinations:

one of the end systems comprises said observation module; and at least one of the end systems is configured to assign the observation configuration field of a frame a predetermined value so that the frame is according to the first observation condition.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION

Hereinafter, any mention of a standard, in particular a computer standard, refers to general principles of this standard that are well known by those skilled in the art and that are independent of different versions of this standard, unless otherwise explicitly mentioned.

Figure 1:
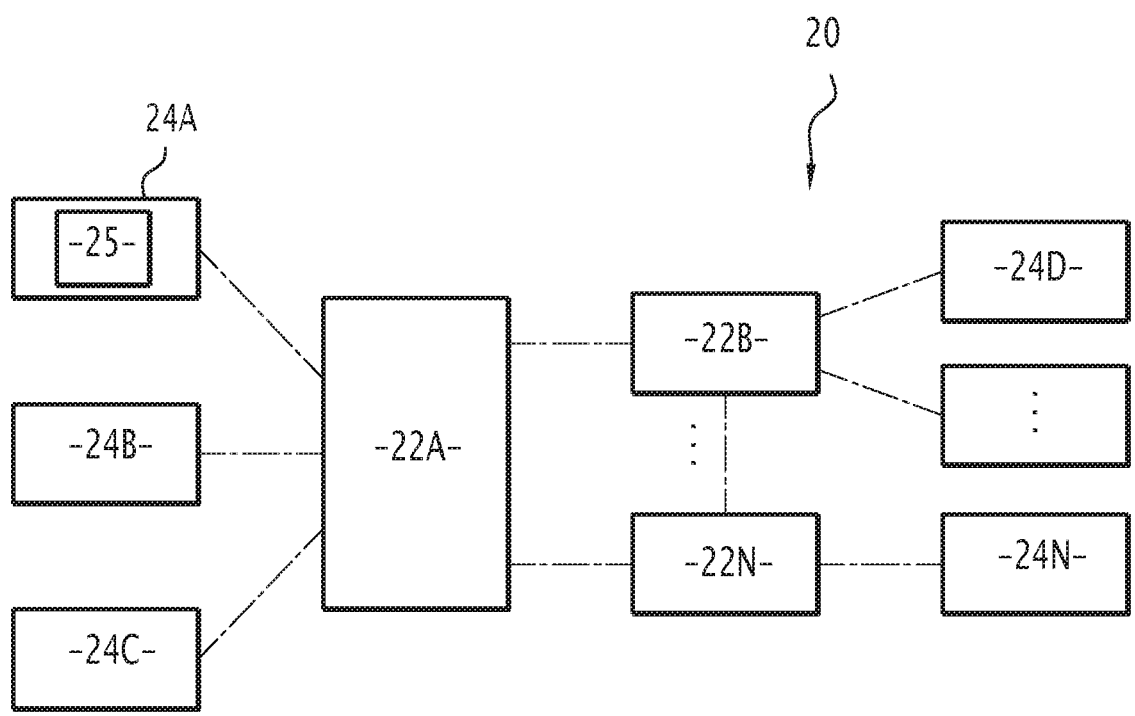
FIG. 1 is a schematic view of a communication system according the invention, the communication system including at least one switch according to the invention.

The communication system 20 of FIG. 1 is embedded in an aircraft, such as an airplane.

This communication system 20 implements at least one avionics network.

According to one specific exemplary embodiment described hereinafter, this avionics network makes it possible to transmit sensitive data between different avionic systems. Sensitive data in particular refers to any data for which the loss or a transmission delay may affect the safety of the aircraft.

In particular, this avionics network makes it possible to transmit data frames according to a transmission protocol for example of the Ethernet type (within the meaning of standard IEEE 802.3-2000 and later versions) with predetermined routing.

Hereinafter, "predetermined routing" refers to routing according to which each frame is conveyed in the network according to predetermined rules.

These predetermined rules are in particular stored in a configuration table of each switch implementing the avionics network and define the conveying of each frame within this switch.

Thus, for example, this is the case when the configuration table of each switch defines, for each frame, an input port and one or several output ports, or when the configuration table of each switch defines, for each frame, one or several output ports.

According to a first embodiment of the invention, said transmission protocol is of type ARINC 664 P7 or has any other known protocol of the Ethernet type with predetermined routing, such as ARINC 664 P3.

Thus, as is known in itself, in the case where the transmission protocol is of type ARINC 664 P7, each frame according to this protocol comprises a header in particular including a field called "MAC DEST". This MAC DEST field extends over 6 bytes.

Furthermore, as is also known in itself, two bytes of the MAC DEST field correspond to a value VL called "virtual link" and defining the path of the frame. The frames including a same value VL form a same flow.

The value VL is stored in the configuration table of each switch through which the flow corresponding to this value VL passes and thus makes it possible to convey each frame within this switch.

Within the meaning of the present invention, the value VL of each frame is called identifier of the corresponding frame.

In the case where the transmission protocol is of type ARINC 664 P3 or any other Ethernet type with predetermined routing, each frame according to this protocol also comprises a header including bits reversed by standard IEEE 802.3.

According to the invention, in this case, the header of each frame defines a value Flow_ID called "flow ID". This value Flow_ID is defined outside the bits reserved by standard IEEE 802.3 with a local Ethernet use.

In this case, the frames including a same value Flow_ID form a same flow.

This value Flow_ID is stored in the configuration table of each switch through which the flow corresponding to this value Flow_ID passes. This allows this switch to identify each frame and to convey this frame in a predetermined manner, according to its configuration table.

Within the meaning of the present invention, the value Flow_ID of each frame is called identifier of the corresponding frame.

Furthermore, according to the invention, each frame according to the protocol of type ARINC 664 P7 or type ARINC 664 P3 or any other Ethernet type with predetermined routing includes an observation configuration field. According to one exemplary embodiment, this observation configuration field extends over one bit and is therefore able to assume two values: "0" and "1". Hereinafter, the value "0" is called predetermined value, which means that the corresponding frame is observable by a switch, as will be explained hereinafter.

According to another exemplary embodiment, the observation configuration field has a more complex structure and for example defines an access level to this frame for the observation. The meaning of this access level will also be explained later.

In reference to FIG. 1, the communication system 20 comprises a plurality of switches 22A, . . . , 22N and a plurality of end systems 24A, . . . , 24N.

Each end system 24A, . . . , 24N is integrated into an avionic system and ensures the communication of this system with the avionics network.

Thus, as a function of the avionic system in which it is integrated, each end system 24A, . . . , 24N can send and/or receive frames according to said transmission protocol.

Each end system 24A, . . . , 24N is connected to at least one of the switches 22A, . . . , 22N via transmission means and via at least one port of this switch. The transmission means for example have a twisted pair cable or any other type of cable allowing a two-way data transmission.

Among the end systems 24A, . . . , 24N, at least one end system, for example the end system 24A, comprises an observation module 25 making it possible to carry out an observation function of at least one of the switches 22A, . . . , 22N, for example the switch 24A, as will be explained hereinafter.

All of the switches 22A, . . . , 22N for example have a substantially identical structure.

Thus, hereinafter, only the structure of the switch 22A will be expended in detail in reference to FIG. 2.

Figure 2:
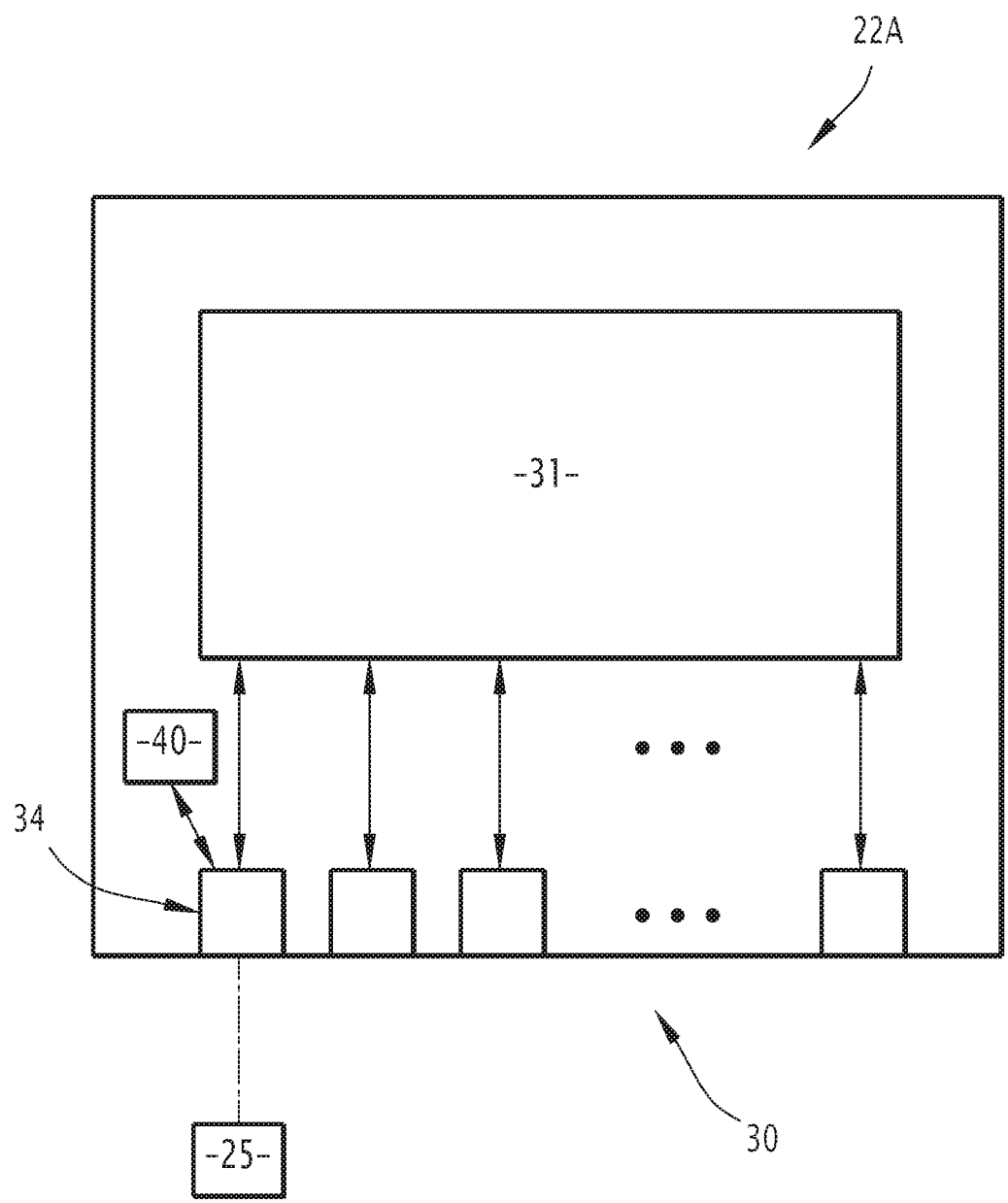
FIG. 2 is a detailed schematic view of the switch of FIG. 1.

As shown in FIG. 2, the switch 22A comprises a plurality of ports 30 and a conveying component 31.

Each port 30 is an input and/or output port.

Furthermore, within the switch 22A, each port 30 is associated with a unique identifier.

The conveying component 31 makes it possible to convey each frame between an input port to an output port according to the configuration table of the corresponding switch 24A. This configuration table is for example integrated into the conveying component 31.

This conveying component 31 for example assumes the form of a programmable logic circuit of the FPGA (Field-Programmable Gate Array) or ASIC (Application-Specific Integrated Circuit) type.

In order to carry out the observation function, at least one of the output ports of the switch 22A is dedicated to this observation function.

This port is referred to hereinafter as observation port and is denoted by reference 34 in FIG. 2.

Thus, as shown in this FIG. 2, the observation port 34 is connected to the observation module 25 and makes it possible to transmit, to this module 25, at least some of the frames conveyed by the conveying component 31 to this port 34.

According to the invention, the conveying component 31 is configured to convey, to the observation port 34, only frames satisfying a first observation condition.

The compliance with this first observation condition is determined as a function of the observation field of the corresponding frame.

In particular, when the observation field extends along a single bit, it satisfies the first observation condition when this field is equal to the predetermined value. This predetermined value corresponds to the value "0" in the described example.

When the observation field has a more complex structure and in particular defines an access level, the compliance of the frame with the first condition is determined for example as a function of this access level and a certain number of outside parameters relative for example to the operation of the communication system 20 and/or of the observation module 25.

Thus for example, these parameters can be relative to the operating mode of the communication system 20 (normal mode, design mode or maintenance mode) and/or the identifier of the user of the observation module 25.

For example, a high access level can be associated with certain frames or flows transporting highly sensitive data. These frames can for example be observable only when the system 20 is in maintenance mode and/or only by certain types of users.

On the contrary, for frames or flows transporting less sensitive data, a low access level can be associated. Thus, these frames can be observable for all users and/or all operating modes of the system 20.

According to the invention, only the frames further satisfying a second observation condition are transmitted from the observation port 34 to the observation module 25.

The compliance of a frame with the second observation condition is determined as a function of the identifier and/or of an input and/or output port associated with this frame.

To that end, according to one example of the invention, the observation port 34 is configured to check the compliance of each frame transmitted to it by the conveying component 31, with the second observation condition.

In this case, the observation port 34 is associated with a configuration table different from the configuration table of the conveying component 31.

This configuration table associated with the observation port 34 for example defines a list of observable flows and/or a list of observable input ports and/or a list of observable output ports.

In order to configure this configuration table, the switch 22A further comprises a configuration module 40 of the observation port 34.

Thus, this configuration module 40 for example allows a user to modify the configuration table associated with the observation port 34 via a suitable interface.

Based on different exemplary embodiments, such a modification can be made when the system 20 is in design mode or in maintenance mode, or in normal operating mode.

Furthermore, in different embodiment variants, the compliance of the frames with the second observation condition can be checked by different components and interfaces of the switch 22A of the observation port 34.

The operation of the communication system 20 will now be explained.

When it is necessary to perform the observation function for example of the switch 22A, at least one sending end system 24A, ..., 24N sends at least certain frames with the observation configuration field satisfying the first observation condition. For example, when the observation field extends over a single bit, the corresponding end system associates the value "0" with this field.

Upon receiving such a frame, the conveying component 31 of the switch 22 determines that it involves a frame having to be observed and sends it to the observation port 34.

In a variant, the conveying component 31 transmits, to the observation port 34, a copy of this frame while transmitting the original frame to one or several other output ports determined by its identifier.

Then, the observation port 34 transmits this frame to the observation module 25 if it further satisfies the second observation condition. To that end, the observation port 34 determines the identifier of the frame and/or the identifier of its input port and/or the identifier(s) of its output ports. Then, the observation port 34 compares this or these identifiers with the associated configuration table.

Then, the observation module 25 performs an analysis of each transmitted frame according to methods known in themselves.

This observation of the switch 22A can therefore be carried out dynamically, at any stage of the operation of the system 20. Thus, for example, it can be carried out during the design, the maintenance or the normal operation of this system.

It is also clear that the dynamic observation according to the invention is carried out while keeping the configuration table associated with the conveying component 31 unchanged. This then does not alter the determinism of the network, which stays according to the avionics constraints.

One can then see that this makes it possible to solve the issues of the state of the art and therefore to steer the observation in an avionics network dynamically, at any stage of the operation of this network, with no impact on its determinism.

The avionics communication system according to a second embodiment of the invention will now be explained.

This communication system is substantially analogous to that according to the first embodiment and in particular comprises the same components. These components will therefore be denoted by the same numerical references as in the previous case.

Unlike the first embodiment, the transmission protocol used in the communication system 20 according to the second embodiment has a mixed protocol made up of a first protocol and a second protocol.

The first protocol is of type ARINC 664 P7.

The second protocol is of the Ethernet type with predetermined routing. This second protocol is for example of type ARINC 664 P3.

Thus, in order to implement the transmission of the frames according to such a mixed protocol, the first conveying component 31 of each switch 22A, ..., 22N is modified relative to the preceding case.

In particular, these elements are modified in order to differentiate each incoming frame according to its protocol and process this frame according thereto.

Additionally, each frame according to the first protocol, that is to say, according to the protocol of type ARINC 664 P7, is processed as a priority relative to each frame according to the second protocol.

The differentiation of the frames according to the first protocol and according to the second protocol is done in the header of these frames.

Thus, for example, the first bytes of the header of each frame according to the second protocol are defined by any value different from the value "0000 0011 0000 0000 0000 0000 0000 0000". It is in fact known that this value is reserved for each frame according to the protocol of type ARINC 664 P7 in the MAC DEST field.

Furthermore, like in the previous case, each frame according to one of these protocols defines an observation configuration field, which makes it possible to indicate, to the component 31 of the switch 22A, whether this frame must be observed.

The invention according to the second embodiment therefore makes it possible to implement an observation function in so-called mixed communication systems. Of course, it is possible to implement this mixability function in any other type of mixed systems.

The invention claimed is:

1. A switch for an avionics communication system transmitting digital data in the form of frames according to a data transmission protocol of the Ethernet type with predetermined routing, each frame comprising an identifier and an observation configuration field;

the switch including:
   a plurality of input ports, each input port being able to receive frames coming from an end system or another switch;
   a plurality of output ports, each output port being able to transmit frames to an end system or another switch, at least one output port, called observation port, being connected to an observation module able to analyze the traffic of the frames passing through via the switch;

a conveying component configured to convey each frame according to said transmission protocol between at least one input port and one or several output ports;

each input and output port being associated with an identifier;

the switch being configured to transmit, to the observation module via the observation port, only frames according to a first observation condition and a second observation condition, wherein the first observation condition is different from the second observation condition; and the compliance of a frame with the first observation condition being determined as a function of the observation configuration field of this frame and the compliance with the second observation condition being determined as a function of the identifier or of an input or output port associated with this frame, wherein the observation configuration field of each frame defines an observation access level of this frame, the compliance with the second observation condition being determined as a function of the observation access level, wherein the observation access level comprises one of a high access level in which the frame is transmitted to the observation module only when the avionics communication system is in at least one of a maintenance mode or based on certain user types or a low access level in which the frame is transmitted to the observation module to be observable by all users and/or all operating modes of the avionics communication system.

2. The switch according to claim 1, wherein the conveying component is configured to check the compliance of each frame with the first observation condition and when this frame complies with this condition, to transmit it to the observation port.

3. The switch according to claim 1, wherein the observation port is configured to check the compliance of each frame with the second observation condition and when this frame complies with this condition, to transmit it to the observation module.

4. The switch according to claim 3, wherein the observation port is associated with a configuration table defining, for each frame, its compliance with the second observation condition as a function of the identifier of this frame or the identifier of the input port having received this frame or the identifier of one or several output ports for which this frame is intended.

5. The switch according to claim 4, further comprising a configuration module making it possible to configure the configuration table of the observation port.

6. The switch according to claim 5, wherein the configuration module is configured to be checked dynamically, during the operation of the avionics communication system.

7. The switch according to claim 1, wherein said transmission protocol is of type ARINC 664 P7.

8. The switch according to claim 1, wherein said protocol is a mixed protocol made up of a protocol of type ARINC 664 P7 and a protocol of the Ethernet type with predetermined routing.

9. The switch according to claim 8, wherein the conveying component is able to differentiate between the data frames according to the protocol of type ARINC 664 P7 and the data frames according to the protocol of the Ethernet type with predetermined routing, and to process each data frame according to the protocol corresponding to it, each data frame according to the protocol of the ARINC 664 P7 type being processed as a priority relative to each data frame according to the protocol of the Ethernet type with predetermined routing.

10. The avionic communication system including:
a plurality of switches connected to one another to form a computer network;
a plurality of end systems, and each end system sending or receiving digital data and being connected to at least one switch;
the digital data taking the form of frames according to a data transmission protocol of the Ethernet type with predetermined routing, each frame comprising an identifier and an observation configuration field;
wherein at least one of the switches is according to claim 1.

11. The system according to claim 10, wherein one of the end systems comprises said observation module.

12. The system according to claim 10, wherein at least one of the end systems is configured to assign the observation configuration field of a frame a predetermined value so that the frame is according to the first observation condition.

* * * * *